United States Patent Office 3,514,397
Patented May 26, 1970

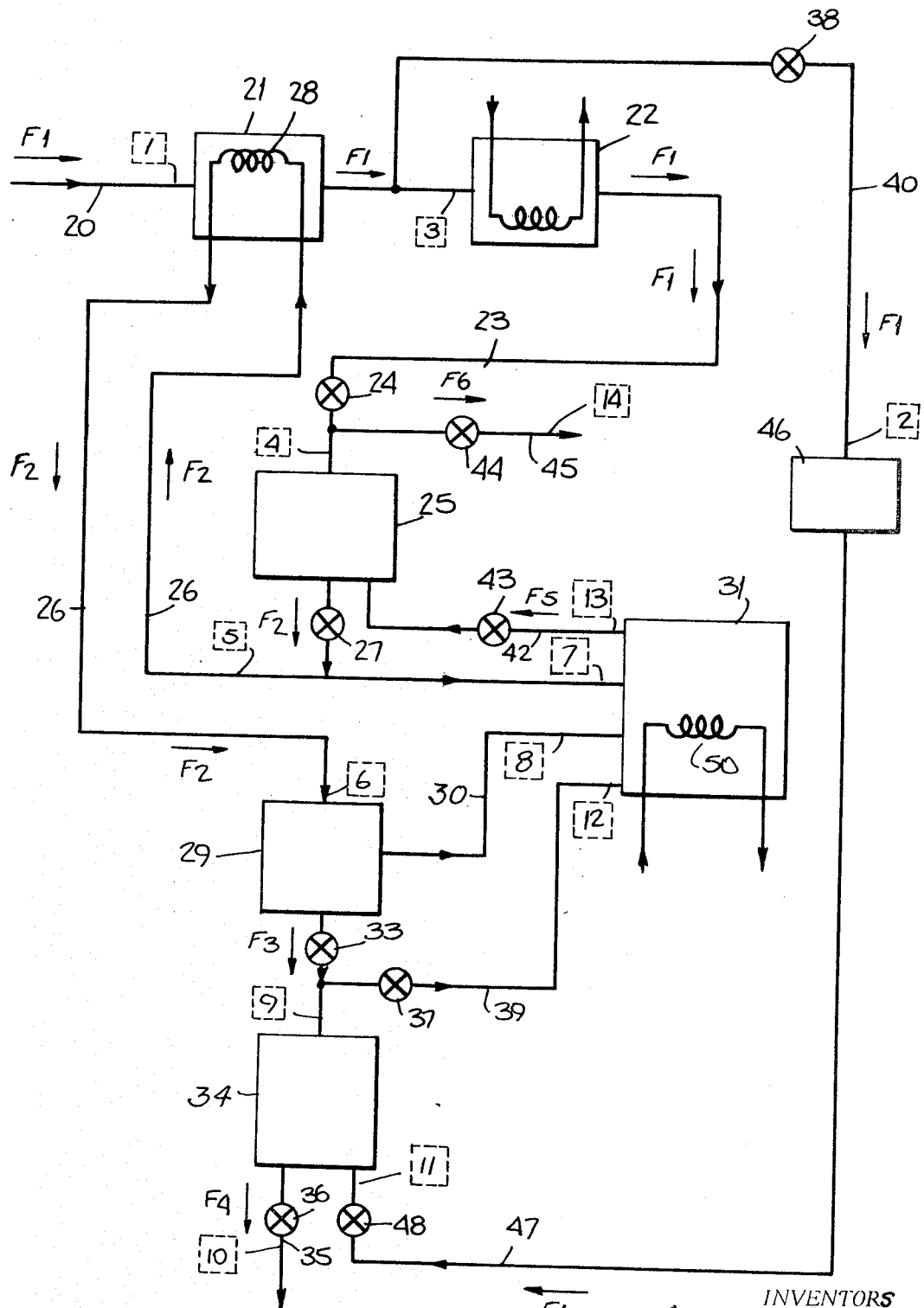

3,514,397
PROCESS UTILIZING ION EXCHANGE FOR DECREASING THE CONCENTRATION OF A SOLUTE
Allen F. Reid, Dallas, Tex. (258 Mill Spring Road, Manhasset, N.Y. 11030), and Albert H. Halff, 3514 Rock Creek Drive, Dallas, Tex. 75204
Filed Mar. 29, 1968, Ser. No. 717,088
Int. Cl. B01d 15/04
U.S. Cl. 210—28    4 Claims

ABSTRACT OF THE DISCLOSURE

The process comprises the heating of a solvent with a difficult-to-separate solute and substituting a second more easily separated solute by ion exchange. The second solute is then precipitated by cooling and separated from the solvent to form a dilute solution of the solvent and the second solute. The second solute is replaced by the first solute to form a purer solution of the solvent and first solute.

BACKGROUND OF THE INVENTION

The process is particularly applicable to the desalting of sea water or brackish water. In the present desalting processes pure water is produced by distillation, chemical ion exchange, electrodialysis and other processes. Osmotic processes are also used in which the solutions are placed under external pressure.

SUMMARY OF THE INVENTION

In this process the difficult-to-separate solute is replaced at an elevated temperature by a more easily separated solute utilizing an ion exchanger. The second solute is then precipitated by cooling and then separated with the second solute being then replaced by the first solute to form a substantially purer solvent product.

An object of the invention is to extract from a solution a solute difficult to separate without the expenditure of large amounts of energy or chemicals.

Another object of the invention is to extract a difficult-to-separate solute by an ion exchanger that may be reconditioned by reverse flow of a second more easily separated solute after passage of the initial solution with the first solute.

Other objects and advantages will be apparent from the drawing.

BRIEF DESCRIPTION OF THE DRAWING

The drawing diagrammatically illustrates the apparatus performing the process.

DETAILED DESCRIPTION

As illustrated in the drawing, a solution F1 comprising a solvent S and a solute A is introduced at a given temperature through the pipe 20 to the heat exchanger or heater 21 and through a second heat exchanger 22 to raise solution F1 to a temperature T2. The solution F1 is then passed through the pipe 23 with valve 24 to the ion exchanger 25. In the ion exchanger 25 the first solute A is replaced by a second solute R to form a second solution F2 comprising the solvent S and the solute R. The solubility of the solute R varies substantially with the temperature, so that the solute R can be easily separated from the solvent S. The solution F2 is passed by pipe 26 with valve 27 through the coils 28 of the heat exchanger 21 to cool the solutioin F2 and precipitate the solute R. The solution F2 with the precipitate is delivered by pipe 26 to the filter 29 where the precipitated solute R is separated and delivered by pipe 30 to the reservoir 31. This forms the third solution F3 comprising the solvent S and a small quantity of the solute R. The solution F3 is passed by pipe 32 with valve 33 to the ion exchanger 34 where the solute R is replaced by the first solute A. The substantially pure and dilute solution F4 of solvent S with a small amount of solute A is discharged from the ion exchanger through the pipe 35 with the valve 36. The ion exchanger 34 is reconditioned with the solvent S by closing valves 33 and 36 and opening valves 37 and 48 in pipes 39 and 47, respectively. The first solution F1 supplied from the reservoir 46 is passed in a reverse direction through the ion exchanger 34 and thence through valve 37 and pipe 39 to the reservoir 31. This returns the second solute R to the reservoir 31 and reconditions the ion exchanger 34 for receiving the solution F3 to replace the solute R with the solute A. The reservoir 46 is filled with solution F1 from the outlet of heater 21 by pipe 40 with valve 38.

A portion of the solution F2 is diverted by pipe 41 to the reservoir 31 to provide solvent S with the solute R to the reservoir 31. This dissolves the precipitated solute R delivered by the pipe 30 from the filter 29. A solution F5 is then supplied by pipe 42 through valve 43 to recondition the ion exchanger 25 by replacing the solute A with the solute R. The solution F6 is discharged as waste through valve 44 and pipe 45. In the reconditioning of the ion exchanger 25 the valves 24 and 27 are closed and the valves 43 and 44 are open.

The heat exchanger 21 recirculates a substantial portion of the heat within the processing. The heat loss of the process is made up in the heater 22 and heater coil 50 in the reservoir 31. If the entering solution F1 is too warm to cool solution F2 sufficiently for adequate precipitation of solute R, additional cooling may be supplied. Solute R that is discharged as waste in the solution F6 can be added to the reservoir 31. The heat from the waste solution F6 may also be returned to the system. Thus the solute A is separated from the solvent S with the minimum expenditure of heat and chemicals.

In the solubility chart inorganic and organic compounds are set forth which may be utilized as the solute R. As noted from this chart these compounds have a wide change in solubility with temperature and some have an extremely low solubility at acceptable low temperatures.

SOLUBILITY CHART

| | Molecular weight | Solubility, grams per 100 grams H$_2$O | | | |
|---|---|---|---|---|---|
| | | Wt. | ° C. | Wt. | ° C |
| Inorganic compounds: | | | | | |
| Barium hydroxide | 315 | 5.6 | 15 | 94.7 | 78 |
| Calcium salicylate | 368 | 2.7 | 15 | 44.7 | 100 |
| Cesium aluminum sulfate | 568 | 0.34 | 0 | 42.5 | 100 |
| Potassium iodate | 214 | 4.74 | 0 | 32.3 | 100 |
| Potassium permanganate | 158 | 2.83 | 0 | 25 | 65 |
| Trisodium phosphate | 380 | 1.5 | 0 | 157 | |
| Sodium sulfate | 142 | 4.76 | 0 | 42.7 | 100 |
| Strontium hydroxide | 122 | 0.41 | 0 | 21.8 | 100 |
| Strontium oxalate | 194 | 0.0051 | 18 | 5 | 100 |
| Sodium tetraborate | 201 | 1.0 | 10 | 52.3 | 100 |
| Organic compounds: | | | | | |
| Biuret | 121 | 1.54 | 15 | 45.5 | 100 |
| Diodecylamine hydrochloride | 222 | 0.4 | 25 | 103 | 100 |
| Gallic acid | 170 | 1.16 | 25 | 33 | 100 |
| 5-OH-isophthalic acid | 182 | 0.06 | | 18 | 100 |
| p-Nitro phenol | 139 | 1.6 | 25 | 26.9 | 90 |
| Phthalic acid | 166 | 0.54 | 14 | 18 | 99 |
| Sulfanilic acid | 191 | 1.08 | 20 | 6.67 | 100 |

On the drawing stations 1 to 14 are indicated in rectangular dash boxes. The process may be performed in purification of salt water with dodecylamine hydrochloride being used as the solute R. On the process chart the approximate amounts of water, sodium chloride and dodecylamine hydrochloride are shown in pounds at the various stations with the corresponding temperatures of the solutions.

PROCESS CHART

| Station | Pounds | | | Degrees centigrade |
|---|---|---|---|---|
| | Water | Sodium chloride | Dodecylamine hydrochloride | |
| 1 | 1,500 | 54.45 | 0 | 10.5 |
| 2 | 36 | 1.31 | 0 | 17 |
| 3 | 1,464 | 53.14 | 0 | 17 |
| 4 | 1,464 | 53.14 | 0 | 30 |
| 5 | 1,100 | 0 | 152.5 | 30 |
| 6 | 1,100 | 0 | 152.5 | 25 |
| 7 | 364 | 0 | 50.5 | 30 |
| 8 | 100 | 0 | 147.5 | 25 |
| 9 | 1,000 | 0 | 5.00 | 25 |
| 10 | 1,000 | 1.31 | 0 | 25 |
| 11 | 36 | 1.31 | 0 | 17 |
| 12 | 36 | 0 | 5.00 | 17 |
| 13 | 500 | 0 | 203 | 40 |
| 14 | 500 | 53.14 | 0 | 40 |

The foregoing example is illustrative of the process performed in accordance with the invention. The other compounds set forth in the solubility chart may also be used. Other similar compounds, both inorganic or organic, not set forth in the chart may be used.

The advantage of the process is that the undesirable difficult-to-separate solute A may be removed from the solvent S to produce a substantially pure solution without the energy demands of vaporizing the solution by heating or solidifying the solution by freezing. The temperatures are kept within acceptable ranges and heat exchangers used to transfer the heat of the process to the incoming solution F1. Also, the substituting solute R is recirculated within the process so that chemicals are not expended in purifying the solvent.

We claim:

1. A process for providing a purer solution from a first solution having a solvent and a first solute comprising passing at an increased temperature the first solution through a first ion exchanger to replace the first solute with a second solute substantially less soluble at a lower temperature to form a second solution, precipitating the second solute by cooling said second solution, separating the second solute from the second solution to form a third solution, replacing the second solute by the first solute in a second ion exchanger to form the purer solution dilute in the first solute.

2. A process as set forth in claim 1 wherein a step is provided of passing a fourth solution of the solvent with the second solute in reverse direction through the first ion exchanger, replacing in the first ion exchanger the first solute by the second solute and discharging from the first ion exchanger the solution with said first solute as waste.

3. A process as set forth in claim 2 wherein the step is provided of passing the first solution in reverse direction through the second ion exchanger to substitute the first solute for the second solute and passing the solution with the second solute from the second ion exchanger to a reservoir.

4. A process as set forth in claim 3 wherein a step is provided for mixing the separated precipitated second solute with the reverse solution from the second ion exchanger and the second solution from said first ion exchanger to form the fourth solution.

References Cited
UNITED STATES PATENTS

| 2,628,165 | 2/1953 | Bliss | 210—28 X |
| 3,042,606 | 7/1962 | Salutsky et al. | 210—28 |
| 3,167,505 | 1/1965 | Dunseth et al. | 210—28 |

JAMES L. DeCESARE, Primary Examiner